United States Patent [19]

Andersson

[11] 4,334,437

[45] Jun. 15, 1982

[54] ARRANGEMENT FOR THE COMPENSATION OF INERTIA FORCES IN THE RECIPROCATING DRIVING OF A MACHINE ELEMENT

[75] Inventor: Pär M. Andersson, Bjärred, Sweden

[73] Assignee: Tetra Pak International AB, Lund, Sweden

[21] Appl. No.: 85,733

[22] Filed: Oct. 17, 1979

[30] Foreign Application Priority Data

Oct. 25, 1978 [SE] Sweden ................................ 7811076

[51] Int. Cl.³ ...................... B60G 11/26; F16H 25/08
[52] U.S. Cl. ............................................ 74/53; 74/36; 267/64.11
[58] Field of Search .................... 74/53; 248/562, 563, 248/565, 566, 599–602, 622, 623, 636; 267/22 R, 65 R, 121, 124, 126

[56] References Cited

U.S. PATENT DOCUMENTS

| | | | |
|---|---|---|---|
| 1,400,974 | 12/1921 | Parker | 248/565 |
| 1,891,340 | 12/1932 | Ammirandoli et al. | 267/22 R |
| 2,333,096 | 11/1943 | Dowty | 267/34 |
| 3,653,682 | 4/1972 | Palmer et al. | 267/65 R |
| 3,918,237 | 11/1975 | Stark et al. | 53/133 |
| 4,033,566 | 7/1977 | Peterson | 267/126 |
| 4,058,301 | 11/1977 | Petrisko | 267/65 R |

FOREIGN PATENT DOCUMENTS

| | | |
|---|---|---|
| 471590 | 2/1951 | Canada . |
| 1953362 | 5/1971 | Fed. Rep. of Germany . |
| 1775170 | 12/1971 | Fed. Rep. of Germany . |
| 563913 | 10/1923 | France ............................. 267/65 R |
| 840221 | 4/1939 | France . |
| 808105 | 7/1960 | France . |
| 1433867 | 6/1966 | France . |
| 2261449 | 9/1975 | France . |
| 577981 | 6/1946 | United Kingdom ................... 74/53 |
| 1275827 | 5/1972 | United Kingdom . |

OTHER PUBLICATIONS

"Which Shock Absorbing System Will Do the Job?", G. Reinert, Product Engineering, May 1, 1961, p. 41–45.

Primary Examiner—Lawrence J. Staab
Attorney, Agent, or Firm—Burns, Doane, Swecker & Mathis

[57] ABSTRACT

When a machine element having a large mass is given a reciprocating movement, the recurring changes in speed as well as direction of movement require that very great driving forces must be applied, which cause varying stresses on the driving unit. In case the movement path of the machine element is more or less vertical the force of gravity causes extra stresses on the machine element. These difficulties are overcome in accordance with the invention by providing a spring system which on the one hand equalizes the effect of the force of gravity on the machine element and, on the other hand compensates the arising mass forces by absorbing, storing and emitting energy following the movement of the machine element. Hereby the amount of applied driving force is reduced, so that shocks and vibrations occurring during the driving are effectively reduced.

1 Claim, 1 Drawing Figure

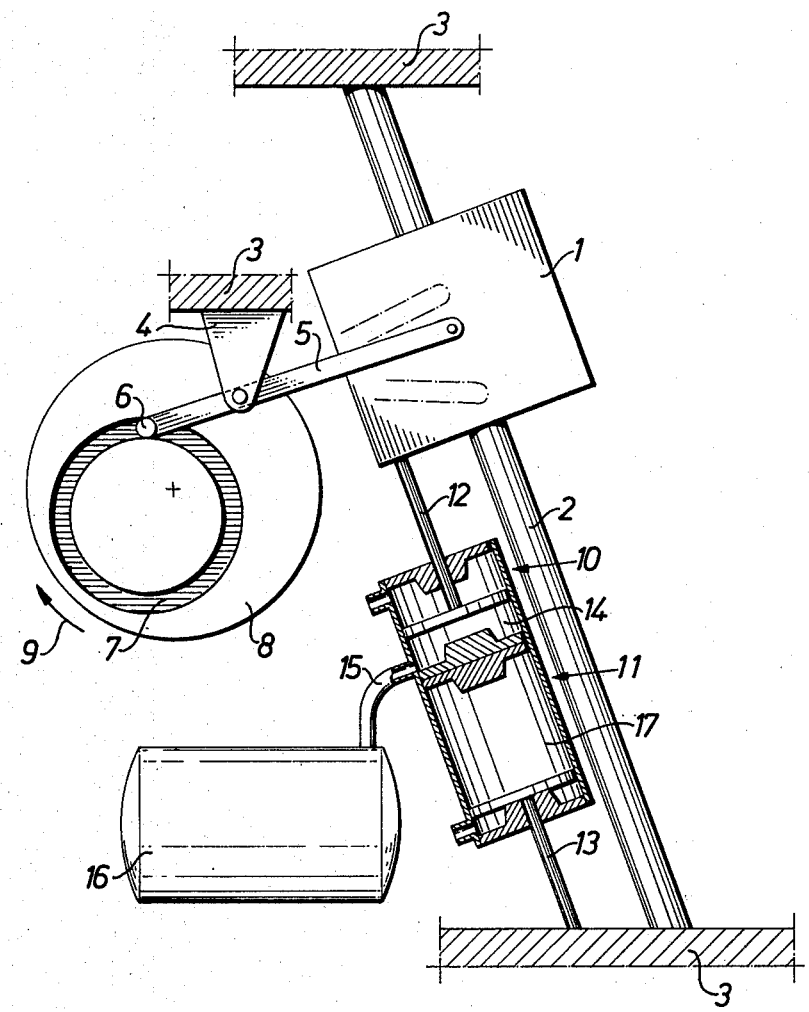

ARRANGEMENT FOR THE COMPENSATION OF INERTIA FORCES IN THE RECIPROCATING DRIVING OF A MACHINE ELEMENT

BACKGROUND AND SUMMARY OF THE INVENTION

The present invention relates to an arrangement for the compensation of inertia forces in a machine element to which a reciprocating movement between an upper and a lower turning point is imparted.

It is very customary in mechanical engineering for a machine element to be driven in a repeated, reciprocating movement. In each direction of movement there occurs at least one acceleration and one deceleration of the machine element, and frequently an intermediate period also exists during which the machine element is driven at constant speed. If the machine member is large, that is to say, if it has a large mass, these constantly recurring changes of speed as well as of direction of movement require that very substantial driving forces must be applied with resulting oscillation and vibration effects. A special problem arises in the case where the path of movement of the machine element is more or less vertical, that is to say, when the machine element is to be displaced between an upper and a lower turning point and vice versa. In such cases the force of gravity will act upon the mass of the machine element so that the driving arrangement is always subjected to an additional stress in one direction.

A machine element with a pattern of motion as described above is described in Swedish patent application No. 7400444-1, to which reference is made. The machine element is driven by means of a motor-driven cam disc and a lever rod in a reciprocating motion between an upper and a lower turning point. The machine element has a large mass and is moved at non-uniform speed. More particularly the machine element is moved in a working stroke from the upper turning point to the lower one at constant speed (apart from a very short distance of acceleration and deceleration respectively in the upper and lower part of the working stroke). In other words, the element is accelerated from zero speed at the lower turning point during half the upward return stroke to the maximum speed. Subsequently, the element is immediately decelerated to zero speed at the upper turning point. Since the cycle time is relatively short (approx. one second) and the mass of the machine element is large (180 kg) a very substantial application of force is required for the driving which force produces oscillations and vibrations in the whole machine. With the intention of reducing these vibrations an arrangement in the form of a pneumatic piston and cylinder unit attached to the machine frame has been provided, whose piston rod is connected to the machine element and acts upon the same in upwards direction. The piston and cylinder unit is the single-acting type and the unit's working chamber is connected to an air tank of a volume which exceeds many times the volume of the working chamber. It is intended thereby to provide the piston with a substantially constant force directed upwards, irrespectively of the position of the piston in the cylinder. However, since the desired force to be applied varies during the total cycle time, the pressure in the working chamber of the piston and cylinder unit had to be calculated for the desired maximum force at a certain instant during the working cycle. During the remainder of the working cycle the piston and cylinder unit provides an excessively large force, which causes a varying stress on the driving unit. Therefore the solution described, in spite of providing a certain reduction in the vibrations, cannot be regarded as a completely satisfactory one.

It is an object of the present invention to provide an arrangement which by being specially adapted to the pattern of motion and mass of the machine element is capable of compensating the inertia forces arising so that an effective reduction of oscillations and shocks is achieved.

It is a further object of the present invention to provide an arrangement which by absorbing and storing energy makes it possible to reduce the amount of applied driving force required.

It is a further object of the present invention to provide an arrangement which is simple and uncomplicated and which, moreover, is not subject to the disadvantages of earlier designs.

These and other objects have been achieved in accordance with the invention by providing an arrangement for the compensation of inertia forces in a machine element to which can be imparted a reciprocating movement between an upper and a lower turning point, which arrangement comprises two spring elements. The first spring element balances the weight of the machine element and the second spring element tends to move the machine element in the direction from the lower turning point.

A preferred embodiment of the arrangement in accordance with the invention has been given the further characteristic that the second spring element tends to move the machine element to a substantially central position between the upper and the lower turning point.

A further embodiment of the arrangement in accordance with the invention has been given the further characteristic that the spring elements consist of first and second pneumatic piston and cylinder units which are arranged in series and connected to the movable machine element as well as to a fixed point.

A further embodiment of the arrangement in accordance with the invention has been given the further characteristic that the first piston and cylinder unit is of the single-acting type. The volume of the first unit's working chamber is enlarged by communication with an air tank whose volume is many times greater than the swept volume of the first piston and cylinder unit.

A further embodiment of the arrangement in accordance with the invention has been given the further characteristic that the pressure in the working chamber of the first piston and cylinder unit is substantially constant and so great that it balances the weight of the machine element.

A further embodiment of the arrangement in accordance with the invention has been given the further characteristic that the second piston and cylinder unit is the single-acting type and has a closed working chamber with a pressure at rest which slightly exceeds the pressure in the working chamber of the first piston and cylinder unit.

A further embodiment of the arrangement in accordance with the invention has been given the further characteristic that the length of stroke of the first spring element is smaller than the distance between the upper and lower turning point of the machine element.

BRIEF DESCRIPTION OF THE DRAWINGS

A preferred embodiment of the arrangement in accordance with the invention will now be described in detail with special reference to the single enclosed schematic drawing, FIGURE which only illustrates the details necessary for the understanding of the present invention.

DETAILED DESCRIPTION OF THE PREFERRED EMBODIMENTS

With reference to the single FIGURE a machine element 1 is moved in a reciprocating movement along a guide bar 2. The two ends of the guide bar 2 are firmly attached to the machine frame 3. The machine frame 3 via a bracket 4 also pivotably supports a lever rod 5, whose one arm is hinged on the machine element 1. The other arm of the lever rod 5 supports a cam follower pulley 6 which runs in a groove 7 on a cam disc 8 rotatable in the direction of the arrow 9 by a (motor not shown in the drawing.)

The lower end of the machine element 1 is attached to the machine frame 3 via an arrangement in accordance with the invention. The arrangement comprises two spring elements having a first and a second pneumatic piston and cylinder unit, 10 and 11 respectively. The two piston and cylinder units are coupled in series with each other, that is to say, the two cylinders are firmly joined to one another whilst a piston rod 12 of the first piston and cylinder unit is attached to the machine element and a piston rod 13 of the second piston and cylinder unit is attached to the machine frame. As can further be seen from the drawing, the two piston and cylinder units 10, 11 are single-acting, that is to say, the chambers are freely connected to the surrounding atmosphere on the piston rod sides of the pistons. The working chamber 14 of the first piston and cylinder unit 10, together with a pressure tank 16 connected to the chamber via a flexible tube 15, forms a closed space wherein a predetermined excess pressure exists.

To ensure correct functioning of the arrangement in accordance with the invention, the pressures in the working chambers of the two piston and cylinder units must have a certain value and be in a certain mutual relationship. In order to calculate the correct pressures, in principle the weight of the mass of the machine element is considered first, and then the volume of air enclosed in the working chamber 14 and the tank 16 is given an excess pressure which, when acting upon the piston of the piston and cylinder unit 10, produces a force directed upwards which counteracts and balances the effect of the force of gravity on the machine element. Owing to the large volume of air in the tank 16 in relation to the air volume of the working chamber 14 proper, the pressure in the working chamber 14 including the tank 16 will be substantially constant irrespective of the position of the piston. The pressure in the working chamber 17 of the second piston and cylinder unit 11 is then chosen so that the pressure at rest, that is to say, the pressure existing in the working chamber 17 when the piston is in the position of rest as shown in the drawing, slightly exceeds the pressure in the working chamber 14.

When the arrangement in accordance with the invention is used for the compensation of inertia forces in a reciprocating machine element, the pressures in the two working chambers, as mentioned previously, are determined according to the mass of the machine element, the speed of movement and the acceleration. In the following example of the action of the arrangement, the pattern of movement of the machine element is assumed to be identical with the pattern of movement which has been described in the Swedish patent application No. 7400444-1. The machine element 1 starting from the upper end position, describes a working stroke directed downwards which, apart from very short acceleration and deceleration distances, takes place at a uniform speed. The subsequent return stroke consists of a rapid acceleration during half the length of stroke and a corresponding deceleration during the remaining movement to the upper turning point.

The machine element 1 is driven, as mentioned earlier, with the help of the cam disc 8, rotating in the direction of the arrow 9, the cam groove 7, the cam follower 6 and the lever rod 5 pivotably supported on the machine frame, at uniform speed in a working stroke directed downwards, which in the position shown in the drawing has just commenced. The movement of the machine element 1 is transmitted via the piston rod 12 to the piston of the first piston and cylinder unit 10 which moves downwards against the effect of the substantially constant force directed upwards which is caused by the air pressure in the cylinder and which via the piston rod 12 is transmitted to the machine element 1. By an appropriate choice of pressure in the working chamber 14 and the tank 16, the force will be so great that the weight of the machine element is substantially neutralized. Since the reduction of volume of the working chamber 14 caused by the movement of the piston is negligible compared with the large volume of the tank 16, the force directed upwards remains substantially constant until the piston of the piston and cylinder unit 10 comes to rest against the bottom wall of the working chamber 14. This resting will occur when the machine element has moved a distance which corresponds to half the working stroke. Since the pressure in the working chamber 17 of the second piston and cylinder unit 11 slightly exceeds the pressure in the working chamber 14, the second piston and cylinder unit will not be effective until the piston in the first piston and cylinder unit has come to a mechanical rest against the wall of the working chamber 14. When this resting occurs the whole combined piston and cylinder assemblies 10, 11 commence to be moved downwards at the same time. The piston of the second piston and cylinder assembly 11 is moved via the piston rod 13 attached to the machine frame 3 into the cylinder so that the volume of the working chamber 17 diminishes. Consequently, the pressure in the working chamber 17 increases, so that a successively increasing force directed upwards is produced which, via the piston rod 12, is transmitted to and tends to decelerate the machine element.

When the machine element 1 is moved against the effect of the force generated in the second piston and cylinder unit 11 to its lower turning point and commences its return movement directed upwards the energy stored in the working chamber 17, owing to compression of the air, will impart to the machine element 1 a return acceleration which substantially corresponds to the acceleration caused by the shape of the cam disc. After half the length of stroke of the machine element 1 the piston in the second piston and cylinder unit reaches its lower position (shown in the drawing) and the accelerating effect of the second unit 11 ceases. On continued upwards movement of the machine element 1 the machine element is decelerated with the help of the cam disc 8 at the same time as the first piston and cylinder unit 10 acts again as a factor neutralizing the force of gravity. When the machine element 1 has attained its upper turning point the process is repeated again.

In accordance with a modified embodiment of the present invention the chamber on the piston rod side of the second air cylinder 11 may be closed and act as a spring which tends to move the machine element from the upper turning point, the combined effect urging the machine element in the direction towards a substantially central position between the upper and the lower turning point. In this way, the second air cylinder also contributes to the deceleration of the machine element when the machine element during the return stroke has passed the centre of the movement and approaches the upper turning point. At the same time, the stored energy, after the machine element turns at the upper turning position, accelerates the machine element in the downwards direction. However, as the downwards motion of the machine element should preferably occur at a uniform, constant speed, it may be appropriate to reduce the accelerating force. This can be achieved e.g. by means of a valve which directly after the machine element has passed the upper turning point reduces the excess pressure in the working chamber on the piston rod side of the cylinder.

Under ideal conditions an arrangement designed in accordance with the modified embodiment, after starting, should describe the desired pattern of movement wholly without application of force via the cam disc. However, since friction losses as well as certain inaccuracies of construction cannot be avoided, a continuous additional contribution of force is required which is reduced to a minimum compared with earlier designs, which were wholly driven via the cam disc. The cam disc is responsible now for only a small portion of the driving and steering of the movement. The shape of the groove is chosen so that the "natural" movement of the machine element induced by the springs is affected as little as possible, which results in an appreciable reduction of the forces and stresses.

The arrangement in accordance with the invention effectively reduces the vibrations occurring on driving of the machine element and furthermore diminishes to a considerable degree the driving force which has to be applied via the cam disc. This allows the majority of machine components to be dimensioned for considerably smaller stresses than had been the case without the arrangement in accordance with the invention, which represents an appreciable saving.

A particularly uniform and vibrationless driving is made possible if the arrangement is such that the machine element during the whole working cycle stresses the lever rod only in the one direction. As a result, inaccuracies and play in the driving arrangement do not cause the occurrence of oscillations and shocks. The modified embodiment described ensures such monodirectional stress in the driving arrangement and may, therefore, be preferred in spite of its more complicated construction, particularly in arrangements having very large masses and changes in speed where a particularly accurate compensation is required.

The principles and preferred embodiment of the present invention have been described in the foregoing specification. However, the invention which is intended to be protected is not to be construed as limited to the particular embodiments disclosed. The embodiments are to be regarded as illustrative rather than restrictive. Variations and changes may be made by those skilled in the art without departing from the spirit of the present invention.

What is claimed is:

1. An apparatus for compensating inertia forces comprising:
   means for driving an element in a predetermined repeated reciprocating motion between substantially fixed first and second end points, said reciprocating motion having a vertical component;
   first spring means for balancing the weight of the element, the first spring means comprises a first piston reciprocable in a first pneumatic cylinder having a first working chamber, the first piston being connected to the element;
   second spring means for aiding movement of the element away from the second end point towards the first end point, the second spring means comprises a second pneumatic cylinder having a second working chamber, the second cylinder being reciprocable about a second piston, said second piston being connected to a fixed frame;
   said working chambers being contained in a continuous cylinder having a wall fixed with respect to the continuous cylinder therebetween; and
   the stroke length of the first piston is less than the distance between the first and second end points whereby the second cylinder moves after the first piston has moved within the first cylinder to contact the fixed wall between the first and second working chambers.

* * * * *